United States Patent [19]

Marianowski et al.

[11] Patent Number: 5,227,256

[45] Date of Patent: * Jul. 13, 1993

[54] FULLY INTERNAL MANIFOLDED FUEL CELL STACK

[75] Inventors: Leonard G. Marianowski, Mount Prospect; Frank C. Schora, Palatine, both of Ill.; Randy J. Petri, Highland, Ind.; Mark G. Lawson, Berwyn, Ill.

[73] Assignee: Institute of Gas Technology, Chicago, Ill.

[*] Notice: The portion of the term of this patent subsequent to Oct. 16, 2007 has been disclaimed.

[21] Appl. No.: 724,422

[22] Filed: Jul. 2, 1991

Related U.S. Application Data

[63] Continuation-in-part of Ser. No. 505,293, Apr. 10, 1990, Pat. No. 5,045,413, and a continuation-in-part of Ser. No. 517,227, May 1, 1990, Pat. No. 5,077,148, said Ser. No. 505,293, is a continuation-in-part of Ser. No. 346,666, May 3, 1989, Pat. No. 4,963,442, said Ser. No. 517,227, is a continuation-in-part of Ser. No. 346,666, May 3, 1989, Pat. No. 4,963,442.

[51] Int. Cl.$^5$ .................. H01M 2/08; H01M 8/06
[52] U.S. Cl. .................. 429/16; 429/35; 429/39
[58] Field of Search .................. 429/13, 16, 34, 35, 429/38, 39, 17

[56] References Cited

U.S. PATENT DOCUMENTS

| | | |
|---|---|---|
| 3,012,086 | 12/1961 | Vahldieck . |
| 3,266,938 | 12/1961 | Parker et al. . |
| 3,488,226 | 1/1970 | Baker et al. . |
| 3,514,333 | 5/1970 | Novack . |
| 3,589,941 | 6/1971 | Eaton et al. . |
| 3,723,186 | 3/1973 | Borucka et al. . |
| 3,867,206 | 2/1975 | Trocciola et al. . |
| 4,160,067 | 7/1979 | Camara et al. . |

(List continued on next page.)

FOREIGN PATENT DOCUMENTS

| | | |
|---|---|---|
| 0384944 | 9/1990 | European Pat. Off. . |
| 62-98567 | 10/1987 | Japan . |
| 1-239773 | 12/1989 | Japan . |
| 1-239774 | 12/1989 | Japan . |

OTHER PUBLICATIONS

Patent Abstracts of Japan, vol. 13, No. 312 (E-788)[3660] Jul. 17, 1989.

*Primary Examiner*—Anthony Skapars
*Attorney, Agent, or Firm*—Speckman & Pauley

[57] ABSTRACT

A fully internally manifolded fuel cell stack is provided by each separator plate, current collector, electrode, and electrolyte in the fuel cell stack having a plurality of aligned perforations forming gas manifolds extending for the length of the cell stack. Each perforation through the separator plate is surrounded by a flattened manifold wet seal structure extending to contact the current collector and/or electrode on each face of the separator plate to form electrolyte/electrode wet seals under cell operating conditions. Conduits through the extended manifold wet seal structure provide gas communication between one set of manifolds and the anode chambers on one face of the separator plates, conduits through the extended manifold wet seal structure on the opposite face of the separator plates provide gas communication between a second set of the manifolds and the cathode chambers on the other face of the separator plates, and conduits through the extended manifold structure of a reactant gas manifold provide communication to interspersed reforming chambers. Extended wet seal structures formed of thin plate metal provide limited flexibility and resiliency to assure good sealing. This structure provides fully internal manifolding of and separation of fuel and oxidant gases to each of the unit fuel cells in the fuel cell stack while providing reactant gas to reforming chambers interspersed along the cell axis to reform hydrocarbonaceous gas and supply enhanced hydrogen content to the fuel supply manifold.

38 Claims, 3 Drawing Sheets

U.S. PATENT DOCUMENTS

| | | |
|---|---|---|
| 4,259,389 | 3/1981 | Vine et al. |
| 4,329,403 | 5/1982 | Baker |
| 4,510,213 | 4/1985 | Schnacke |
| 4,522,894 | 6/1985 | Hwang et al. |
| 4,579,788 | 4/1986 | Marianowski et al. |
| 4,702,973 | 10/1987 | Marianowski |
| 4,708,916 | 11/1987 | Ogawa et al. |
| 4,761,348 | 8/1988 | Kunz et al. |
| 4,769,298 | 9/1988 | Hosaka |
| 4,781,727 | 11/1988 | Mitsuda et al. |
| 4,786,568 | 11/1988 | Elmore et al. |
| 4,824,739 | 4/1989 | Breault et al. |
| 4,963,442 | 10/1990 | Marianowski et al. ........ 429/13 |
| 5,045,413 | 9/1991 | Marianowski et al. ........ 429/13 |
| 5,077,148 | 12/1991 | Schora et al. ........ 429/16 |

OTHER PUBLICATIONS

Patent Abstracts of Japan, vol. 9, No. 318 (E-366)[2041] Dec. 13, 1985.

Patent Abstracts of Japan, vol. 13, No. 364 (E-805)[3712] Aug. 14, 1989.

Patent Abstracts of Japan, vol. 13, No. 518 (E-848)[3866] Nov. 20, 1989.

Michael Tarjanyi, Lawrence Paetsch, Randolph Bernard, Hosein Ghezel-Ayagh, "Development of Internal Reforming Catalysts for the Direct Fuel Cell", pp. 177-181, 1985 Fuel Cell Seminar, Tucson, Arizona, May 19-22, 1985.

Patent Abstracts of Japan, vol. 12, No. 273 (E-639) [3120] Jul. 29, 1988.

Patent Abstracts of Japan, vol. 12, No. 130 (E-603) [2977] Apr. 21, 1988.

Patent Abstracts of Japan, vol. 13, No. 288 (E-781) [3636] Jun. 30, 1989.

Patent Abstracts of Japan, vol. 13, No. 46 (E-711) [3394] Feb. 2, 1989.

Patent Abstracts of Japan, vol. 13, No. 325 (E-792) [3673] Jul. 21, 1989.

Patent Abstracts of Japan, vol. 13, No. 88 (E-721) [3436] Feb. 28, 1989.

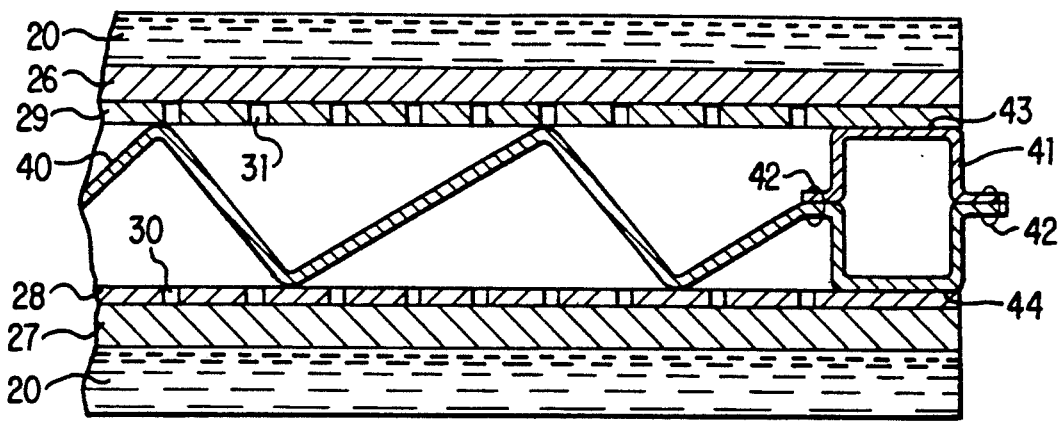
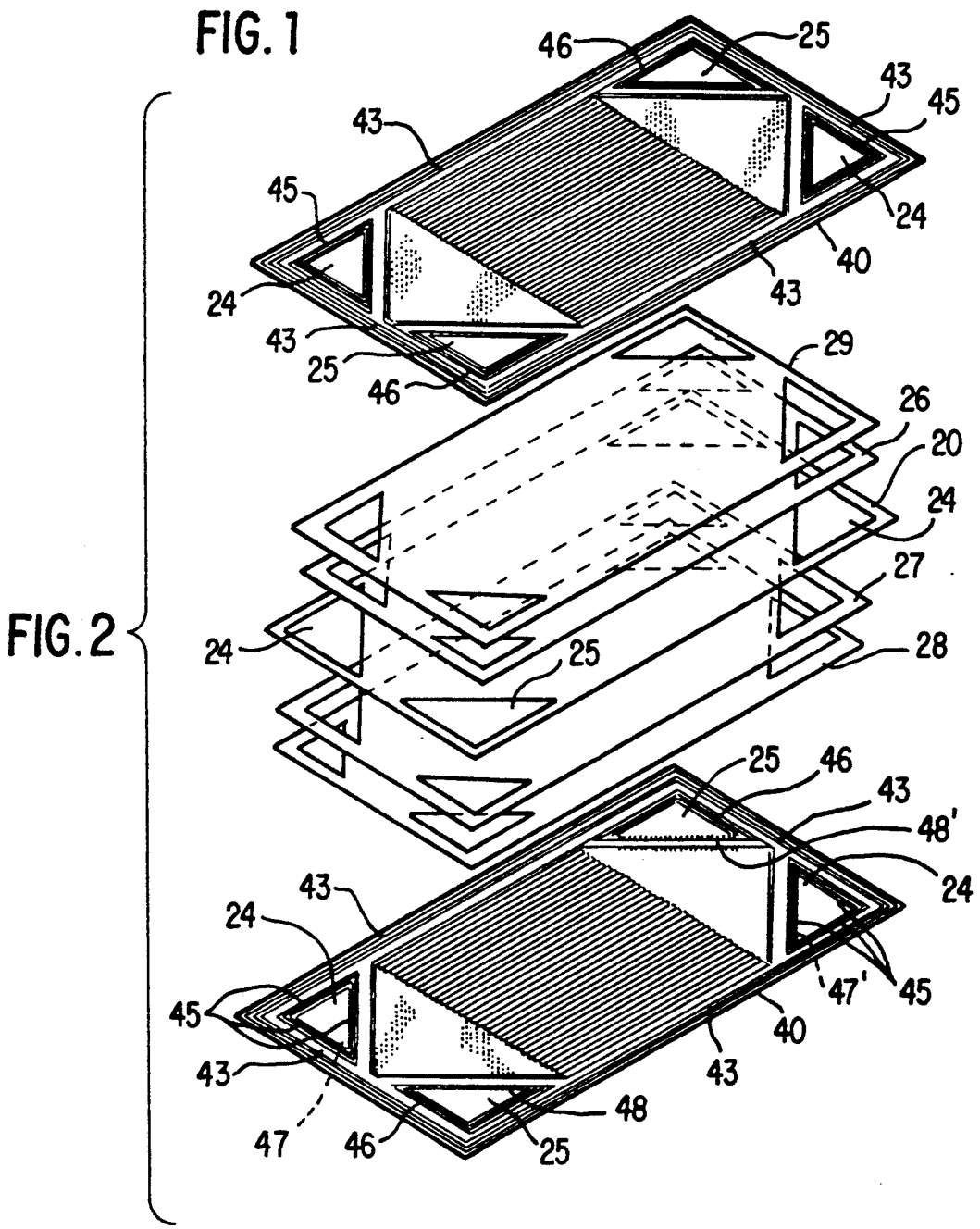

FULLY INTERNAL MANIFOLDED FUEL CELL STACK

CROSS REFERENCE TO RELATED APPLICATIONS

This application is a continuation-in-part of U.S. patent application Ser. No. 07/505,293, filed Apr. 10, 1990, entitled Fully Internal Manifolded Fuel Cell Stack, now U.S. Pat. No. 5,045,413, and continuation-in-part of U.S. patent application Ser. No. 07/517,227, filed May 1, 1990 entitled Fully Internal Manifolded and Internal Reformed Fuel Cell Stack, now U.S. Pat. No. 5,077,148, each of said applications a continuation-in-part of U.S. patent application Ser. No. 07/346,666, filed May 3, 1989, entitled Internal Manifolded Molten Carbonate Fuel Cell Stack, now U.S. Pat. No. 4,963,442.

BACKGROUND OF THE INVENTION

1. Field of the Invention

This invention relates to internally manifolded and internally manifolded and internally reformed fuel cell stacks, and in particular, sub-assemblies of an anode/-current collector/ separator plate/current collector/-cathode therefore which upon assembly with electrolyte have wet seals between the electrolyte and electrodes. The sub-assemblies provide ease of assembly and long term stability and the separator plate design provides capability of having internal reforming chambers, which are separated from the anode chambers, spaced along the height of the stack. This invention is particularly applicable to molten carbonates and solid conductor/solid oxide fuel cells.

Generally, fuel cell electrical output units are comprised of a stacked multiplicity of individual cells separated by inert or bi-polar electronically conductive ferrous metal separator plates. Individual cells are sandwiched together and secured into a single stacked unit to achieve desired fuel cell energy output. Each individual cell generally includes an anode and cathode electrode, a common electrolyte tile, and a fuel and oxidant gas source. Both fuel and oxidant gases are introduced through manifolds to their respective reactant chambers between the separator plate and their respective electrode. The area of contact between the electrolyte and other cell components to maintain separation of the fuel and oxidant gases and prevent and/or minimize gas leakage is known as the wet seal. A major factor attributing to premature fuel cell failure is corrosion and fatigue in the wet seal area. This failure is hastened by corrosive electrolyte contact at high temperatures and high thermal stresses resulting from large temperature variations during thermal cycling of the cell causing weakening of the structure through intracrystalline and transcrystalline cracking. Such failures permit undesired fuel and/or oxidant gas crossover and overboard gas leakage which interrupts the intended oxidation and reduction reactions thereby causing breakdown and eventual stoppage of cell current generation. Under fuel cell operating conditions, in the range of about 500° to 700° C., molten carbonate electrolytes are very corrosive to ferrous metals which, due to their strength, are required for fuel cell housings and separator plates. The high temperature operation of stacks of molten carbonate fuel cells increases both the corrosion and thermal stress problems in the wet seal area, especially when the thermal coefficients of expansion of adjacent materials are different.

This invention provides fully internal manifolding of the fuel and oxidant gases to and from the individual cells of an assembled stack in a manner, due to the design of the cell components, which provides ease of assembly, long term endurance and stability of fuel cell operation. This invention may also provide internal manifolding for a separated reforming chamber for internal cell reforming of hydrocarbon containing fuels without poisoning of the reforming catalyst. The endothermic reaction of reforming methane to carbon oxide and hydrogen is advantageously carried out within the cell stack.

2. Description of Related Art

Commercially viable molten carbonate fuel cell stacks may contain up to about 600 individual cells each having a planar area in the order of eight square feet. In stacking such individual cells, separator plates separate the individual cells with fuel and oxidant each being introduced between a set of separator plates, the fuel being introduced between one face of a separator plate and the anode side of an electrolyte matrix and oxidant being introduced between the other face of the separator plate and the cathode side of a second electrolyte matrix.

The emphasis in fuel cell development has been in external manifolding of the fuel and oxidant gases by using channel manifolds physically separable from the fuel cell stack. However, the inlets and outlets of each cell must be open to the respective inlet and outlet manifolds which must be clamped onto the exterior of the cell stack. To prevent electrical shorting, insulation must be used between the metal manifolds and the cell stack. External manifolding has presented serious problems in maintaining adequate gas seals at the manifold-/manifold gasket/cell stack interface while preventing carbonate pumping within the gasket along the potential gradient of the cell stack. Various combinations of insulating the metal manifold from the cell stack have been used, but with the difficulty of providing a sliding seal which is gas tight and electrically insulating while being carbonate impermeable under high temperature molten carbonate fuel cell operating conditions, no satisfactory solution has been found. The problem of manifolding and sealing becomes more severe when larger number of cells and larger planar areas are used in the cell stack. When greater number of cells are used, the electrical potential driving the carbonate in the seal area along the height of the stack increases, and when the planar area of the cell increases, the linear tolerances of each component and the side alignment of each component becomes extremely difficult to maintain in order to maintain the mating surface sealed between the manifold/manifold gasket/and cell stack.

Cell stacks containing 600 cells can be approximately 10 feet tall presenting serious problems of required stiffness of external manifolds and the application of a clamping force required to force the manifold onto the cell stack. Due to the thermal gradients between cell assembly and cell operating conditions, differential thermal expansions, and the necessary strength of materials used for the manifolds, close tolerances and very difficult engineering problems are presented.

Conventionally, stacks of individual molten carbonate fuel cells have been constructed with spacer strips around the periphery of a separator plate to form wet seals and to provide intake and exhaust manifolds. Various means of sealing in the environment of the high temperature fuel cell wet seal area are disclosed in U.S. Pat. No. 4,579,788 teaching the wet seal strips are fabricated utilizing powder metallurgy techniques; U.S. Pat. 3,723,186 teaching the electrolyte itself is comprised of inert materials in regions around its periphery to establish an inert peripheral seal between the electrolyte and frame or housing; U.S. Pat. No. 4,160,067 teaching deposition of inert materials onto or impregnated into the fuel cell housing or separator in wet seal areas; U.S. Pat. No. 3,867,206 teaching a wet seal between electrolyte-saturated matrix and electrolyte saturated peripheral edge of the electrodes; U.S. Pat. No. 4,761,348 teaching peripheral rails of gas impermeable material to provide a gas sealing function to isolate the anode and cathode from the oxidant and fuel gases, respectively; U.S. Pat. No. 4,329,403 teaching graded electrolyte composition for more gradual transition in the coefficient of thermal expansion in passing from the electrodes to the inner electrolyte region; and U.S. Pat. No. 3,514,333 teaching housing of alkali metal carbonate electrolytes in high temperature fuel cells by use of a thin aluminum sealing gasket. None of the above patents deal with sealing around internal fuel and oxidant in fuel cell stacks.

Gas sealing of a phosphoric acid fuel cell, which operates at about 150° to 220° C., by filling the pores of a porous material periphery of the cell constituents with silicon carbide and/or silicon nitride is taught by U.S. Pat. No. 4,781,727; and by impregnating interstitial spaces in substrate plate edge is taught by U.S. Pat. Nos. 4,786,568 and 4,824,739. The solution of sealing and corrosion problems encountered in low temperature electrolytic cells, such as bonding granular inert material with polytetrafluorethylene as taught by U.S. Pat. No. 4,259,389 gaskets of polyethylene as taught by U.S. Pat. No. 3,012,086; and "O" ring seals taught by U.S. Pat. No. 3,589,941 for internal manifolding of fuel only are not suitable for high temperature molten carbonate fuel cells.

U.S. Pat. No. 4,510,213 teaches transition frames surrounding the active portion of the cell units to provide fuel and oxidant manifolds to the gas compartments of the individual cells, the manifolds not passing through the separators nor the electrolyte tiles of the cells. The transition frames require complicated insulating between adjacent cells and are made up of several separate and complicated components. U.S. Pat. No. 4,708,916 teaches internal manifolding of fuel and external manifolding of oxidant for molten carbonate fuel cells wherein sets of fuel manifolds pass through electrodes as well as electrolytes and separators in a central portion and at opposite ends of the individual cells to provide shortened fuel flow paths. The end fuel manifolds are in a thickened edge wall area of the separator plate while the central fuel manifolds pass through a thickened central region and sealing tape impregnated with carbonate or separate cylindrical conduit inserts are provided extending through the cathode.

Internal manifolding has been attempted wherein multiple manifold holes along opposite edges of the cell have been used to provide either co- or counter-current flow of fuel and oxidant gases. These manifold holes for fuel have been located in a broadened peripheral wet seal area along opposing edges, but the manifolds have been complicated structures exterior to the electrolyte or pass through at least one of the electrodes. However, adjacent manifold holes are used for fuel and oxidant which provides short paths across a short wet seal area and leakage of the gases as well as the necessarily broadened peripheral seal area undesirably reducing the cell active area, as shown, for example in U.S. Pat. No. 4,769,298. Likewise, prior attempts to provide internal manifolding have used multiple manifold holes along broadened peripheral wet seal areas on each of all four edges of the cell to provide cross flow, but again short paths between adjacent fuel and oxidant manifold similar complicated structures and holes caused leakage of the gases and further reduced the cell active area.

When using gasification products as fuel, it is desirable to reform the hydrocarbonaceous components to enhance the hydrogen content of the fuel by internal reforming within the fuel cell stack. However, conventional reforming catalysts are known to be poisoned by molten carbonates electrolytes due to active sites being covered by a film of carbonates. See "Development of Internal Reforming Catalysts for the Direct Fuel Cell", Michael Tarjanyi, Lawrence Paetsch, Randolph Bernard, Hosein Ghezel-Ayagh. 1985 Fuel Cell Seminar, Tucson, Ariz., May 19-22, 1985. pgs. 177-181. Additional known problems causing failure in long term endurance of molten carbonate fuel cells also include deformation of the porous anode structure, corrosion of anode side hardware such as current collector, separator plate, and the like, by the molten carbonates electrolyte and electrolyte loss thereby, gas cross-over through the porous anode, and electrolyte loss by anode and cathode dissolution. There have been many attempts to solve one or more of these problems to provide long term fuel cell stability and endurance.

Increasing the hydrogen content of the fuel feed stream to the anode compartment of a fuel cell is taught by several patents. U.S. Pat. No. 3,266,938 teaches a plurality of high temperature fuel cells arranged in series such that the spent gases from the anode compartment of the first fuel cell in the series is catalytically reformed exterior to the cell by an endothermic reforming reaction to produce additional hydrogen and then passed to the anode compartment of a second cell in the series; the spent gases of the anode compartment of the second fuel cell is passed to a catalytic exothermic shift reaction exterior to the cell for further production of hydrogen for passage to the anode compartment of a third fuel cell in the series. The reforming and shift reactions are performed exterior to the fuel cells to provide greater hydrogen content to the fuel feeds to the anode compartments of the fuel cells. U.S. Pat. No. 4,522,894 teaches increasing the hydrogen content of a liquid hydrocarbon feed by catalytic oxidation and steam reforming wherein use of thermal energy from the oxidation is used for reforming external to the fuel cell, to produce high hydrogen content in the fuel feed stream to the anode compartment of the fuel cell. U.S. Pat. No. 3,488,226 teaches low temperature, low pressure steam reforming of liquid hydrocarbons to enhance hydrogen in the fuel feed for the anode compartment of molten carbonate fuel cells wherein the reforming is performed exterior to the fuel cell and acts as a heat sink for fuel cell produced heat. In one embodiment, the reforming catalyst may be placed in the fuel cell anode chamber. In either arrangement, the waste heat from the fuel cell is used directly to sustain the endothermic reforming reaction for the generation of hydrogen. U.S. Pat. No. 4,702,973 teaches a dual compartment anode structure for molten carbonate fuel cells wherein the molten carbonates electrolyte is isolated from contaminated fuel gases and reforming catalysts by a hydrogen ion porous and electrolyte non-porous metallic foil.

SUMMARY OF THE INVENTION

This invention provides full internally manifolded fuel cell stacks, especially suitably for use in high temperature molten carbonate fuel cell stacks. The fully internally manifolded fuel cells of this invention are suitable for any cell having planar components, especially high temperature fuel cells such as molten carbonates and solid conductor/solid oxide fuel cells. A generally rectangular fuel cell stack is made up of a plurality of fuel cell units, each fuel cell unit comprising an anode and a cathode, an electrolyte in contact on one side with the anode and in contact on the opposite side with the cathode, and a separator plate separating cell units between the anode of one cell and cathode of the adjacent cell forming an anode chamber between one side of the separator plate and the anode and a cathode chamber between the opposite side of the separator plate and the cathode. The fuel cell units are stacked and provided with end plates having the same internal configuration as the separator plates forming half cells at each end and clamped to provide rigid structure to the fuel cell stack. In the fuel cell stacks of this invention, the electrolytes, electrodes, current collectors, and separator plates may have about the same overall dimensions and extend to the region of the edge of the fuel cell stack. The separator plates have a flattened peripheral seal structure extending from the plane of the separator plate to contact a current collector and/or electrode on each face of the separator plates completely around their periphery to form a peripheral seal. A subassembly of an anode, anode current collector, separator plate, cathode current collector and cathode may be fabricated under controlled conditions and then such a subassembly combined with the electrolyte and electrolyte matrix portion of the cell when making up the cell stack.

This invention may also provide fully internally manifolded fuel cell stacks having separated chambers for reforming of hydrocarbonaceous fuel within the fuel cell stack to provide additional hydrogen fuel and to withdraw thermal energy for the endothermic reforming reaction thereby providing desired cooling of the fuel cell stack required due to heating by the exothermic electrochemical reaction of the fuel cell. This invention is especially suitable for use in high temperature molten carbonate fuel cell stacks and provides separation of the reforming catalyst from the electrolyte, which, in the case of molten alkali carbonates, readily poisons the catalyst.

The electrolytes, electrodes, current collectors and separator plates have a plurality of aligned perforations in desired locations, each separator plate perforation being surrounded by a flattened manifold seal structure extending from the plane of the separator plate to contact the current collector and/or electrode on each face of the separator plate to form a separator plate/current collector and/or electrode seal surrounding each perforation to form a gas manifold through each perforation and extending through the cell stack. Conduits or holes through the extended manifold seal structure provide gas communication between fuel manifolds and the anode chambers on one face of the separator plates and conduits or holes through the extended manifold seal structure provide gas communication between the oxidant manifolds and the cathode chambers on the opposite face of the separator plates. This structure provides fully internal manifolding of fuel and oxidant gases to and from each of the unit fuel cells in the fuel cell stack. In a similar manner, hydrocarbonaceous reaction gas and steam may be supplied to reforming chambers interspersed throughout the fuel cell stack and hydrogen enriched reformed product gas passed from each of the reforming chambers to a fuel manifold for supply to downstream anode compartments.

The stack end plates are configured similarly to the separator plates on their inner sides and are provided with means for supply and exhaust for each of the sets of manifolds of the fuel cell stack. External means of supplying and exhausting fuel gas, oxidant gas, and hydrocarbonaceous reaction gas and steam to and from the appropriate sets of manifolds at the end plate connections may be provided by any means known to the art. By "sets of manifolds" we mean a first set makes up one or more fuel inlets, a second set one or more spent fuel outlets, a third set one or more oxidant inlets, a fourth set one or more spent oxidant outlets, and a fifth set one or more reaction gas inlets. The perforations through the separator plates, current collectors, electrodes and electrolytes forming the manifolds may be round, square, rectangular, triangular, or any other desired shape and size. While each such perforation is referred to as a single perforation, it may comprise baffling to provide desired gas distribution. Any number of manifolds may be provided through the cell components as necessary to provide desired gas flow quantities and patterns across the active areas of the cell. It is important in this invention to provide seals directly between the separator plate and current collectors and/or electrodes around each manifold with the edge of adjacent manifolds being separated by at least about 0.25 inch. This invention also provides a continuous peripheral seal directly between the separator plate and current collectors and/or electrodes exterior to the regions of the internal manifolds.

In one preferred embodiment, the separator plates in accordance with this invention are thin pressed metal plates provided with corrugations and/or dimples in the fully active fuel cell area and pressed to form on one face the full peripheral and the manifold seal structures with a thin metal upstanding seal structure welded to the opposite face of the separator plate to provide full peripheral and the manifold seals between the separator plate and current collector or electrode on opposite faces of the separator plates. Any structure may be used to provide the extended seal areas, such as bars, strips formed by powder metallurgy techniques, and the like. Sub-assemblies of the separator plate with an anode current collector and/or anode on one side and a cathode current collector and/or cathode on the opposite side may be made by welding or brazing the metallic components together in the region of the manifold and the peripheral seal structures.

In a preferred embodiment conduits or holes through the extended manifold seal structure providing gas communication between the manifold and the anode and cathode chambers as well as the reforming chamber may be openings provided by appropriately corrugated metal or may be holes through sheet metal or bar structures.

This invention provides assured sealing of one gas conduit from the adjacent gas conduit, thereby affording effective means for providing fully internally manifolded gas feed and removal from high temperature and corrosive fuel cells, such as, molten carbonate fuel cell stacks. Use of the structure of this invention also provides effective and varied means for providing carbonate to multi-cell stacks.

The structure of this invention may also provide fully internally manifolded reforming chambers interspersed in the fuel cell stack to reform hydrocarbonaceous fuel gas providing enhanced hydrogen fuel to the anode compartments while advantageously utilizing electrochemical produced thermal energy to drive the reforming reaction and cool the fuel cell stack.

This invention provides a mass producible configuration of the fuel cell components, particularly the sub-assembly of the separator plate, anode current collector and/or anode, and cathode current collector and/or cathode and its cost effective fabrication under controlled conditions. Use of the sub-assemblies of this invention provides ease of assembly of the fuel cell stack and modularization for varying sizes of fuel cell stacks.

This invention also provides a process for production of electricity using the fully internally manifolded fuel cell stack with internal reforming, particularly, molten alkali metal carbonates fuel cell stacks.

BRIEF DESCRIPTION OF THE DRAWING

Further features of the invention will be apparent from the following detailed description of the invention read in conjunction with the drawing, wherein:

FIG. 1 is a sectional side view of a peripheral wet seal area of a fuel cell according to one embodiment of this invention;

FIG. 2 is an exploded perspective view of a single cell unit of a fuel cell stack in accordance with one embodiment of this invention;

DESCRIPTION OF PREFERRED EMBODIMENTS

Figure 3:
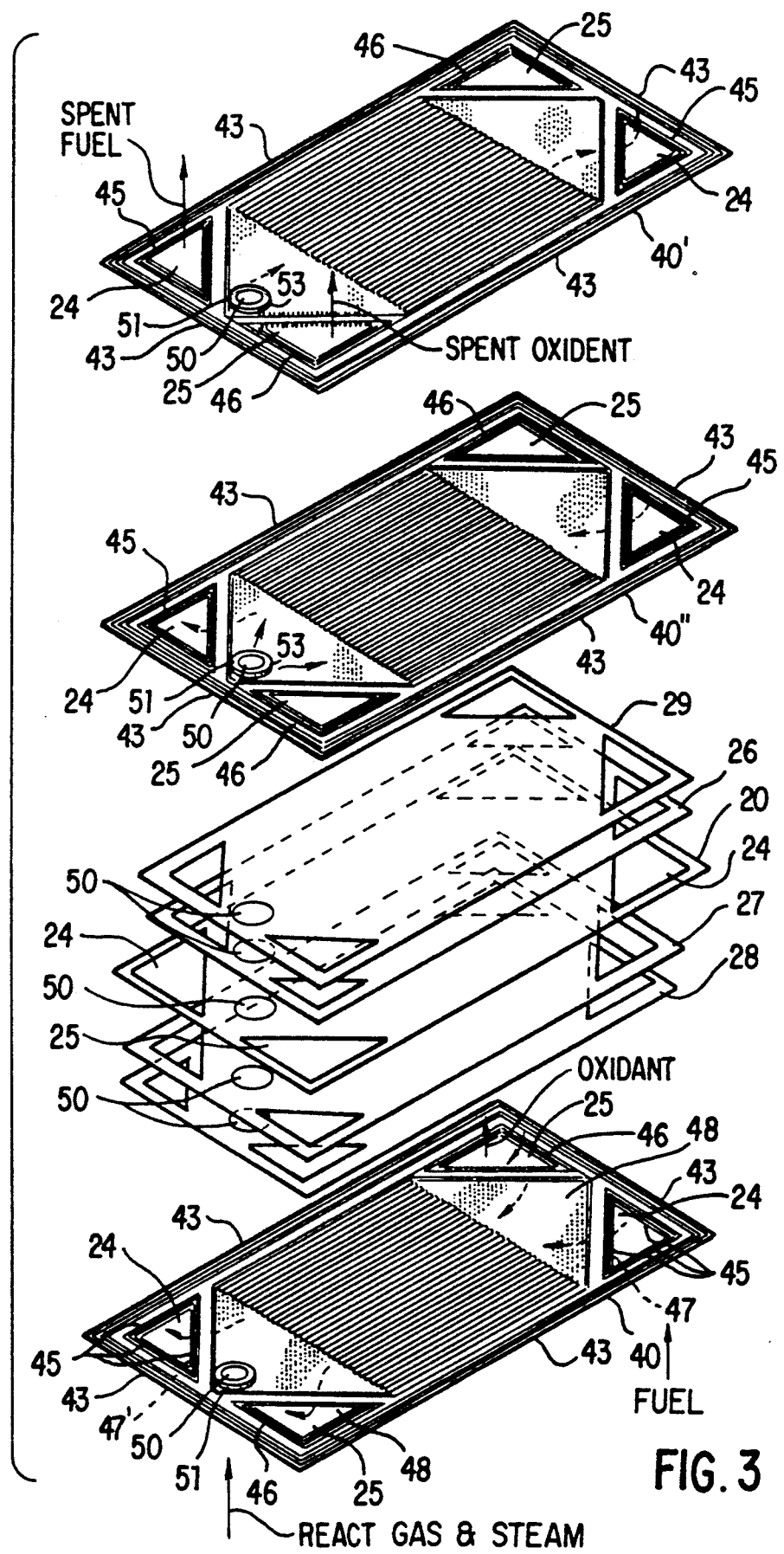
FIG. 3 is a schematic exploded perspective view of a portion of a fuel cell stack with an internal reforming chamber according to one embodiment of this invention.

In preferred embodiments of this invention flow of fuel and oxidant through the fully internal manifolded fuel cell stack is the same as described in allowed U.S. patent application Ser. No. 07/505,293, now U.S. Pat. No. 5,045,413 incorporated herein in its entirety by reference. Likewise, flow of fuel, oxidant, and reaction gas and steam through the fully internal manifolded and internal reformed fuel cell stack is the same as described in allowed U.S. patent application Ser. No. 07/517,227, now U.S. Pat. No. 5,077,148 incorporated herein in its entirety by reference. These prior applications describe in greater detail embodiments of the invention directed to having the electrodes and current collectors mounted in recesses provided in the separator plates with wet seals between the electrolyte and separator plate being formed by upstanding manifold wet seal structures and peripheral wet seal structures extending to contact the electrolyte providing generally fluid-tight anode, cathode and reforming chambers in communication with desired fully internal fuel, oxidant, reactant and steam, and exhaust manifolds. The embodiments described in greater detail in this application, are directed to electrodes and current collectors extending to the peripheral region of the separator plate which enlarges acceptable manufacturing tolerances and renders sub-assembly of the electrodes, current collectors and separator plate a more practical alternative. In the embodiments more fully described in this application, the wet seals are between the electrolyte and the current collectors and/or electrodes in the seal areas surrounding each of the internal manifolds and the peripheral seal area.

This invention is directed toward fully internally manifolded fuel cell stacks. In preferred embodiments the electrolyte tile, electrodes, current collectors, and separator plates are each penetrated by aligned manifold conduits. Each of these components is about the same overall size, the electrodes and current collectors extending to or near the cell periphery. These embodiments overcome problems of very close tolerances required to fit electrodes and current collectors tightly within recesses of separator plates. These embodiments also simplify and make practical the subassembly of anode/current collector/separator plate/current collector/cathode preassembled units. Preassembly of these components greatly facilitates assembly of fuel cell stacks by significantly reducing the number of stack components to the preassembled subassemblies and the electrolytes. This invention preferably utilizes thin sheet separator plates having pressed seal areas extending from one face of the separator plate and thin sheet forms extending from the opposite face of the separator plate to form manifold and peripheral seal areas. The thin sheet seal areas afford limited flexibility and resilience to provide tight sealing.

A fuel cell stack according to this invention provides flow of fuel and oxidant gases fully internal to the cell stack, as more fully described in the prior applications above identified and incorporated herein by reference. Manifold holes may be provided in the corner areas of the electrolyte which extends to the edge of the cell together with the cell separator plates, as shown in the prior applications. By contact between the electrolyte and the separator plate on each face forming conventional wet seals on each face around the periphery of the electrolyte, the containment of the fluids is maintained. Through desired openings providing fluid communication between manifold holes and anode and cathode compartments, the desired gaseous flow may be obtained while providing sealing of the manifold holes with conventional wet seals between the electrolyte and separator plate. The embodiments more fully described in this application have electrodes and current collectors extending to the peripheral region of the separator plates and thus require matching manifold holes in the electrodes and current collectors and provide wet seals between the electrolyte and electrode, rather than between the electrolyte and the separator plate as in the prior described embodiments.

The matching manifold holes in the separator plates, electrolyte tiles, electrodes and current collectors form manifold conduits which are continuous for the entire height of the fuel cell stack for gas supply and exhaust. This invention provides that a manifold conduit extending internally to all cells in a fuel cell stack is supplied from a single external opening, whereas prior externally manifolded fuel cell stacks have required external openings to and from each individual fuel cell. The gases are fed to the fuel cell stack through an end plate which acts as one half cell and are exhausted through a similar end plate which acts as another half cell.

The manner in which fluids are fed to and withdrawn from fuel cell stacks can take on a wide variety of variations. Gas sealing is accomplished by sealing between the electrolyte tiles and the electrodes in the conventional wet seal manner both around the periphery of the separator plate and in each gas manifold area as desired for conducting the gas to desired locations within each individual cell and the reforming chambers interspersed in the fuel cell stack. The wet seals are formed in these areas due to the corresponding upstanding seal structures on both sides of the separator plate.

As shown in FIG. 1 of each of the prior applications, electrolyte 20 and separator plate 40 extend to the outer edge of the cell and are sealed to each other around their periphery in wet seal areas 23. The individual molten carbonate fuel cell unit is shown with anode 26 spaced from one face of separator plate 40 to provide an anode chamber fed by fuel manifold hole 24 as indicated by arrow 38. On the other face of separator plate 40 cathode 27 is spaced from separator plate 40 to form a cathode chamber in communication with oxidant manifold holes 25 as indicated by arrow 39. Electrolyte 20 and separator plate 40 extend to the outer edge of the cell forming peripheral wet seal areas 23 which provide peripheral wet seals between the electrolyte and separator plate for containment of fluid. Fuel manifold wet seal area 45 and oxidant wet seal area 46 provide manifold sealing by electrolyte/separator plate wet seals and provide desired guidance of fluid to anode and cathode chambers on opposite sides of separator plate 40. No additional gaskets are used for sealing and the cell unit can accommodate a wide variety of carbonate addition techniques, including use of carbonate tapes.

FIG. 1 of this application, not drawn to scale, shows in detail a peripheral seal area in accordance with one embodiment of this invention wherein thin sheet separator plate 40 is corrugated with the peaks on one face of the corrugations adjacent cathode 27 current collector 28 with perforations 30 and formed to have flat thin sheet separator plate peripheral seal area 44 which lies adjacent cathode current collector 28 on the cathode face of the cell. Separator plate seal strip 41 formed from thin metal strip material is welded by welds 42, or otherwise attached, to the anode face of separator plate 40 to provide flat separator plate seal strip peripheral seal area 43 which lies adjacent anode 26 current collector 29 with perforations 31 on the anode side of the cell. It is readily apparent that the position of the separator plate and the seal strip may be reversed and that spacing of separator seal strip seal area 43 and separator seal area 44 may be formed to fit the spacing requirements of individual cells. It is seen that each of the cell components extends to about the periphery of the cell, but here dimensions are not critical as long as there is sufficient overlap of seal areas 43 and 44 to form the wet seals between the electrolyte and electrode and/or current collector in the wet seal area created by the upstanding portions of the separator plates. Similar wet seals are formed around each of the manifolds by similar upstanding seal structures on each side of the separator plate. The porous electrodes may be filled with a higher melting material, such as a brazing material, in the areas of the wet seals to prevent leakage of the liquid electrolyte through the electrodes under cell operating conditions. The wet seals are formed due to pressure from the upstanding wet seal areas on both faces of the separator plates around the periphery of the separator plates and around each of the internal manifolds when the cell stack is tightened together. We have found that narrow wet seal areas function better than wider ones. It is desired that the upstanding wet seal areas be constructed of the same thin material as the separator plate, about 0.010 to about 0.050 inch and preferably about 0.015 to about 0.025 inch, which we have found to restrict the width to less than about 1 inch in order to avoid sagging and yielding which leads to leaking. Preferably, the width of the upstanding wet seal structures is about 0.25 to about 0.75 inch to avoid the necessity of internal bridging and supports. Further, we have found that wet seals of up to about 1 inch wide provide required complete removal of organic binders from green electrolyte matrix tapes during cell heat-up to allow good carbonate electrolyte retention in the electrolyte matrix. Wet seals wider than about 1 inch show indications of residual carbonaceous material and lesser amounts of carbonate electrolyte which could lead to leaky wet seals during cell operations. Again, no additional gaskets are used for sealing and the cell unit can accommodate a wide variety of carbonate addition techniques, including use of carbonate tapes.

When carbonate tapes are used, the carbonate tapes and electrolyte matrix extend to the cell edges and although the inter-cell spacing decreases in proportion to the thickness of the carbonate tapes when they melt, sealing and conformity of all cell components is maintained at all times. During cell heat-up prior to carbonate tape melting, sealing is maintained around each manifold hole 24 and 25 because the carbonate tapes and the electrolyte matrix, such as $LiAlO_2$, extend adjacent to the respective sealing surfaces and contain a rubbery binder. During binder burn-out, which occurs prior to carbonate melt, gas flows are maintained and sealing is obtained. When the binder is burned off and the cell temperature raised to the melting point of the carbonate, the melting carbonate is absorbed by the porous $LiAlO_2$ tape and the electrodes. The inter-cell spacing decreases as the carbonate tapes melt but at all stages from room temperature to operating temperatures of about 650° C. cell sealing is maintained. The limited flexibility and resiliency of the thin sheet metal in the seal areas aids in assuring maintenance of cell sealing.

FIG. 2 is a perspective exploded view of a fuel cell unit of a molten carbonate fuel cell stack according to one embodiment of this invention with separator plates 40, cathode 27, cathode current collector 28, electrolyte 20, anode 26 and anode current collector 29. Separator plates 40, electrodes 26 and 27, current collectors 28 and 29, and electrolyte 20 extend to the edge region of the cell and form wet seals at both faces of separator plates 40 between electrolyte 20 and cathode 27 and/or current collector 28 and between electrolyte 20 and anode 26 and current collector 29 around the entire periphery of the cell in peripheral wet seal areas 43. Peripheral wet seal structures 43 are extended both upwardly and downwardly from the general plane of separator plate 40 to provide contact with the periphery of current collectors and/or electrodes on both faces of separator plate 40. Separator plates 40, electrodes 26 and 27, and current collectors 28 and 29, and electrolyte tile 20 are each penetrated by corresponding fuel manifold holes 24, one for supply and one for removal, and oxidant manifold holes 25, one for supply and one for removal. While the manifold holes shown in FIG. 2 are a preferred triangular shape providing easily formed straight thin sheet manifold wet seal areas, the manifold holes may be round, rectangular or any other desired shape.

The manifold holes shown in FIG. 2 are single openings, but partitions may be used in the single openings as desired to direct gas flow across the cell reactant chambers. Fuel manifold wet seal areas 45 and oxidant manifold wet seal areas 46 are extended both upwardly and downwardly from the general plane of separator plate 40 to provide contact with the current collector and/or electrode on both faces of separator plate 40 to form wet seals between the electrolyte and the adjacent current collector and/or electrode defining the gas conduits in the same manner as described for the peripheral wet seals.

As best seen in FIG. 2, oxidant manifold holes 25 are sealed by oxidant manifold wet seals 46 providing oxidant flow only to and from the cathode chamber (adjacent the upper face of the separator plate as shown) by oxidant supply openings 48 and oxidant exhaust openings 48' and preventing gas flow to or from the anode chamber while fuel manifold holes 24 are sealed by fuel manifold wet seals 45 providing fuel flow only to and from the anode chamber (adjacent the lower face of the separator plate as shown) by fuel supply openings 47 and fuel exhaust openings 47' and preventing gas flow to or from the cathode chamber. While the manifold wet seals are shown as straight pressed sheet metal structures, they can be any desired shape or structure to prevent gas flow. The manifold wet seals form a double wet seal between fuel manifold hole 24 and oxidant manifold hole 25.

Separator plates 40 may be comprised of suitable materials providing desired physical strength and gas separation. The separator plates are desirably very thin, about 0.010 to about 0.050 inch thick, preferably about 0.015 to about 0.025 inch thick. In many cell stacks it is preferred to use bimetallic separator plates in which stainless steel may be used on the cathode face and nickel or copper on the anode face to avoid ferrous metal corrosion. The nickel or copper may be a cladding, lamination or plating about 10 percent the thickness of the separator plate. Separator plates may also be fabricated from ferrous alloys, such as type 300 series stainless steel alloys. The separator plates provide the dual function of providing a gas chamber non-reactive separator as well as providing structural strength to the fuel cell as an internal load bearing member. While it is preferred to use separator plates having a corrugated and/or dimpled cross-sectional shape in the active area to provide both strength and better gas circulation adjacent the electrodes, the principles of this invention are also applicable to flat separator plates structured to provide peripheral seal areas and to provide seals around internal manifold holes while allowing gas to pass to and from the internal manifolds as required for fuel cell operation.

Thin stamped stainless steel plates have been used in heat exchange technology as exemplified by the publications "Modern Designs For Effective Heat Transfer," American Heat Reclaiming Corp., 1270 Avenue of the Americas, New York, New York 10020 and "Superchanger Plate and Frame Heat Exchanger," Tranter, Inc. Wichita Falls, Texas 76307. These heat exchangers use a series of gasketed embossed or pressed metal plates bolted together between end frames to provide channels for passage of hot medium on one side of the plate and passage of cold medium on the other side of the plate. However, fuel cell stack separator plates present very different problems of sealing and corrosion under molten alkali metal carbonates fuel cell operating conditions and different manifold configuration, sealing, and fluid communication means since two fluids must pass in separated relation between adjacent separator plates. In heat exchange, only one fluid passes between adjacent heat exchange plates. However, the technology of fluid flow over the electrodes of the fuel cell stack of this invention may advantageously utilize design techniques and patterns of plate heat exchangers, such as herringbone, washboard, straight corrugations and mixed corrugations.

Figure 4:
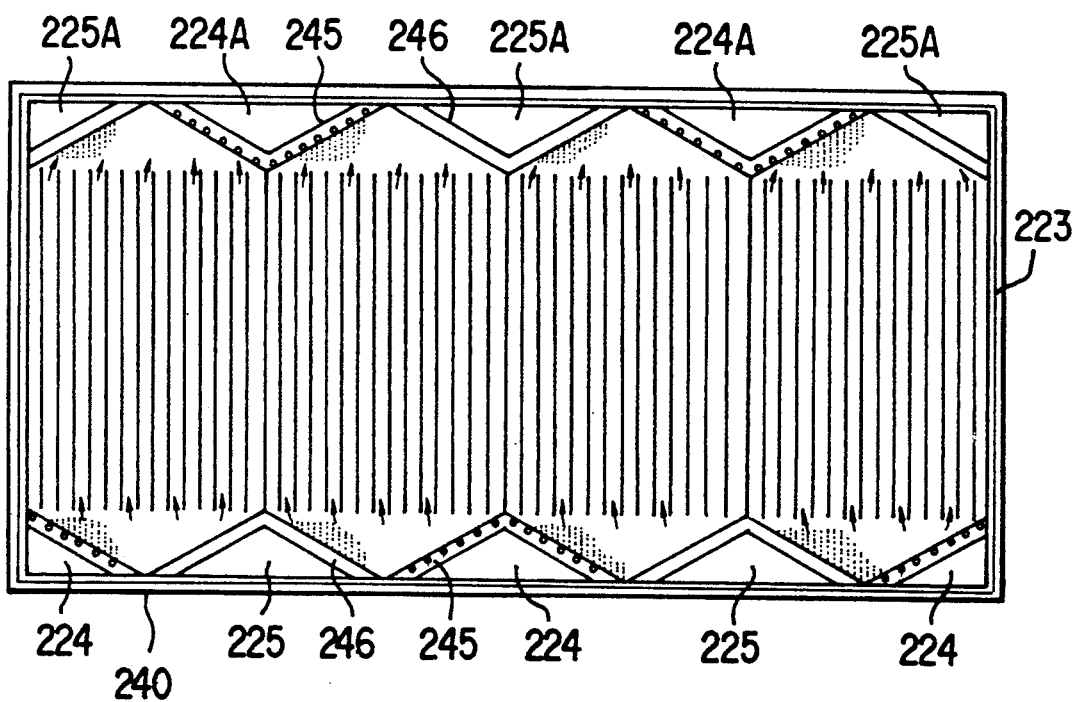
FIG. 4 is a front face view of another embodiment of a separator plate for a fully manifolded fuel cell stack according to this invention.

In addition to embodiments of separator plates according to this invention as shown and described in greater detail in our prior above identified patent applications with respect to co-linear and counter-linear flow on opposite sides of the separator plate, FIG. 4 shows another embodiment of a separator plate useful in this invention. The separator plate shown in FIG. 4 has four similar repeating areas to provide desired gas flow when fabricating commercially feasible large area cells, in the order of 10,000 $cm^2$ or about 34 by 57 inches. FIG. 4 shows separator plate 240 with fuel supply manifold holes 224 providing fuel as indicated by the arrows which passes across the active area of the cell through the anode chamber to fuel exhaust manifold holes 224A. Oxidant is supplied to the opposite side of separator plate 240 through oxidant supply manifold holes 225 and passes through the cathode chamber to oxidant exhaust manifold holes 225A. Each of the fuel manifold holes is sealed by a wet seal 245 and each of the oxidant manifold holes is sealed by a wet seal 246 between the electrolyte and the corresponding anode or cathode and/or its current collector to prevent fluid leakage. Likewise, the entire periphery of the cell is sealed by a wet seal 223 between the electrolyte and the corresponding anode or cathode and/or its current collector. FIG. 4 shows a separator plate configuration suitable for large scale fuel cell stacks according to this invention, but it will be apparent that a number of other configurations are also suitable.

FIG. 3 shows one embodiment of a fuel cell stack having unit cells as shown in FIG. 2 with a reforming chamber suitable to be interdispersed along the axis of the fuel cell stack. The reforming chamber is located between anode separator/reformer plate 40" and cathode separator/reformer plate 40'. Separator plates 40, cathode 27, cathode current collector 28, electrolyte 20, anode 26 and anode current collector 29 are similar to those previously described with respect to FIG. 2 except for the provision of reactant gas manifold holes 50. Reactant gas manifold wet seal areas 51 extend on both faces from the general plane of separator plate 40 to provide contact to form wet seals between electrolyte 20 and the adjacent electrode and define the reactant gas manifold, as described above with respect to the oxidant and fuel manifolds. Reactant gas manifold holes 50 are the same diameter in each of the cell components to allow the flat surface of reactant gas manifold wet seal area 51 to force contact between electrolyte 20 and cathode 27 and/or cathode current collector 28 on one side and between electrolyte 20 and anode 26 and/or anode current collector 29 for formation of a wet seal surrounding the reactant gas manifold. The side walls of the extended reactant gas manifold wet seal areas are solid in separator plates 40 and therefore do not allow entry of reactant gas into the anode or cathode chambers. Anode separator/reformer plate 40" is different from separator plate 40 only in that oxidant supply openings 48 and oxidant exhaust openings 48' shown in separator plate 40 are not present and thus there is no communication between any of the oxidant manifolds and the reformer chamber adjacent the upper surface of anode separator/reformer plate 40″. Reactant gas openings 53 in the sidewall of extended reactant gas manifold wet seal area 51 may be provided for communication between reactant gas manifold 50 and the reformer chamber. In a similar manner, the lower side of cathode separator/reformer plate 40′ is modified by having solid sidewalls of extended spent fuel manifold wet seal area 45 to block communication between the reformer chamber and spent fuel manifold 24 by not providing fuel exhaust openings 47′. Reactant gas supply openings 53 may be provided for communication between reactant gas manifold 50 and the reformer chamber formed between anode separator/reformer plate 40″ and cathode separator/reformer plate 40′. With these modifications to the standard separator plate 40, a reforming reaction chamber with fully internally manifolded reaction gas and steam supply may be interspersed at desired intervals in the fuel cell stack. In similar manner to described above, the separator/reformer plate may be preassembled to form a sub-assembly of the separator/reformer plate with its corresponding electrode and current collector.

When the fuel cell stack is assembled, the peripheral wet seal area and all manifold wet seal areas of anode separator/reformer plate 40″ come into contact with the corresponding wet seal areas extending from cathode separator/reformer plate 40′ forming a tight metal/metal seal which, due to the limited flexibility and resiliency in the wet seal area, effectively seal the manifolds from the reformer chamber formed by the volume between plates 40″ and 40′. If desired, the extended wet seal areas forming the reformer chamber may be further extended than on separator plates 40 to provide greater spacing between the separator/reformer plates and higher reformer chamber volume. Another way to increase reformer chamber volume, if desired, is to provide sidewall extensions to each of the manifold wet seal areas and the peripheral wet seal area by welding such extensions to the separator/reformer plates providing any desired depth to the reformer chamber while providing closure of the reforming chamber and sealed passage of desired manifolds through the reformer chamber. When such additional depth is provided to the reformer chamber, metallic electrical conducting pillars may be provided at desired spaced locations between the separator/reformer plates to provide rigidity to the reformer chamber structure and to provide electrical continuity. In a similar manner, the entire reformer chamber structure including its corresponding current collectors and electrodes may be preassembled prior to fabrication of the fuel cell stack.

It is seen that the essential components for a fuel cell stack to have interspersed along its axis a plurality of reforming chambers is that each reforming chamber is formed by two spaced separator/reformer plates, one having an outer configuration of the face of the separator plate facing the anode chambers and the second having an outer configuration of the other face of the separator plate facing the cathode chambers, the two separator/reformer plates sealingly joined in their edge area to enclose a reformer chamber, conduits through the extended manifold wet seal structure providing reactant gas and steam communication from a reactant gas supply manifold to the reformer chamber, and conduits through the extended manifold wet seal structure providing enriched hydrogen product gas communication to a fuel gas supply manifold, thereby providing fully internal manifolding of reactant gas and steam to and product gas from each reformer chamber in the fuel cell stack.

Conventional reforming catalysts, such as supported nickel, may be used in the reformer chamber for conduct of the well known steam reforming reaction for the production of hydrogen from hydrocarbonaceous materials, such as natural gas or fuel obtained by gasification of naturally occurring organic carbonaceous materials such as coal, shale, or by anaerobic digestion. Any source of methane containing gas may be used to supply reactant hydrocarbonaceous gas to the reforming chambers.

As shown by the arrows, hydrocarbonaceous reaction gas and steam may be supplied from reactant gas manifold 50 to the reformer chamber, passed over reforming catalyst in the reforming chamber enhancing the hydrogen content of the product gas which is passed directly into fuel supply manifold 24. In this manner, the hydrogen content of fuel passing through the fuel supply manifold may be enhanced along the axis of the cell.

The ability of fully internal manifolding a fuel cell stack a afforded by this invention allows interspersing of reforming chambers within the fuel cell stack which utilizes electrochemically generated heat to drive the reforming reaction while desirably cooling the electrochemical unit fuel cells and while providing enhanced hydrogen fuel to the fuel supply manifold along the axis of the cell stack. Isolation of the reforming catalyst from the fuel cell electrolyte avoids poisoning of conventional reforming catalysts by molten carbonate electrolytes. The fully internally manifolded fuel cell stack with reforming of hydrocarbonaceous materials within the fuel cell stack provides improved overall fuel to electricity cell efficiency. According to this invention, natural gas may be used as a reactant to provide enhanced hydrogen fuel for the electrochemical reaction by placement of a reforming chamber, as described above, between about every five to about ten electrochemical unit cells.

While the use of reforming chambers has been described above with respect to the separator plate configuration shown in FIG. 2, it is clear that such reforming chamber configurations may be adopted to a wide variety of separator plate configurations by designation of certain of the internal manifolds as reactant gas manifolds with communication to a reforming chamber in a similar fashion to that described above. The essential element in provision of internal reforming chambers according to this invention is the fully internal manifolded fuel cell stack providing fuel supply and withdrawal, oxidant supply and withdrawal, and reactant gas supply through internal manifolds which may be arranged as desired and connected only through the end plates to external supply and exhaust conduits.

By use of electrolyte/electrode and/or current collector wet seals, communication between the fuel manifold and only the anode face of the separator plate and between the oxidant manifold and only the opposite cathode face of the separator plate, can be achieved without porous gaskets as are essential when external manifolding is used. While the principal wet seal is between the electrolyte and the electrode, there may be some wet seal between the electrolyte and the current collector which may extend beyond the electrode in some areas, and there may be some wet seal between the electrolyte and the seal areas of the separator plate in instances where they are not completely covered by the current collector or electrode. Additionally, reforming chambers may be interspersed along the axis of the fuel cell stack as described above. Further, each gas manifold seal area may be aluminized to reduce corrosive and other wicking processes.

Using the fully internal manifolding of this invention, the inter-cell changes of distance resulting from melting of the carbonates tape occurs at the factory assembly site and once such melting occurs there are no further changes in inter-cell distances. The height of the cell stack shipped from the factory will be the same as that during operation in a pressure vessel at the use site. The height of the reforming chambers will not change during start-up or fuel cell operation. Thus, the only follow up required during fuel cell stack operation is that required to maintain the cell holding force on the active and seal areas.

The advantages of the cell configurations and cell stacks of this invention have been described principally with respect to molten carbonates electrolyte fuel cells, but they are readily applicable to other high temperature fuel cells such as solid conductor/solid electrolyte fuel cells providing internal electrical conduction by transport of oxygen ions and/or oxygen vacancies in the solid oxide electrolyte. There are a number of known suitable solid oxide electrolytes, such as yttrium doped zirconia, various perovskite compounds which conduct oxide ion, and solid proton conductors such as ytterbium doped barium cerates. The fuel cell stack configurations of this invention are particularly advatageous of these types of solid conductor/solid oxide fuel cells.

While in the foregoing specification this invention has been described in relation to certain preferred embodiments thereof, and many details have been set forth for purposes of illustration, it will be apparent to those skilled in the art that the invention is susceptible to additional embodiments.

We claim:

1. In a fuel cell stack comprising a plurality of fuel cell units, each said fuel cell unit comprising an anode and a cathode, an electrolyte in contact on one side with the electrolyte facing face of said anode and in contact on the opposite side with the electrolyte facing face of said cathode, and a separator plate separating said cell units between an anode and cathode forming an anode chamber between the anode facing face of said separator plate and said anode and forming a cathode chamber between the opposite cathode facing face of said separator plate and the separator facing face of the cathode of an adjacent said fuel cell unit, said anode chamber in gas communication with fuel gas supply and outlet and said cathode chamber in gas communication with oxidant gas supply and outlet the improvement comprising; said electrolytes and said separator plates extending to the peripheral edge of said fuel cell stack, said separator plates having a flattened peripheral wet seal structure extending to contact less than about 1 inch width of said electrolytes on each face of said separator plates completely around their periphery forming a peripheral wet seal less than about 1 inch width under cell operating conditions, said electrolytes and said separator plates each having a plurality of aligned perforations said perforations in said separator plates being surrounded by a flattened manifold wet seal structure extending to contact less than about 1 inch width of said electrolyte on each face of said separator plate forming a manifold wet seal less than about 1 inch width under cell operating conditions to form a plurality of gas manifolds extending through said cell stack, conduits through said extended manifold wet seal structure providing fuel gas communication between one set of said manifolds and said anode chambers on one face of said separator plates and conduits through said extended manifold wet seal structure providing oxidant gas communication between a second set of said manifolds and said cathode chambers on the other face of said separator plates, thereby providing fully internal manifolding of fuel and oxidant gases to and from each said unit fuel cell in said fuel cell stack.

2. In a fuel cell stack according to claim 1 wherein cell stack end plates are configured the same as said separator plates on their inner faces and form half cells on each end of said fuel cell stack.

3. In a fuel cell stack according to claim 2 wherein said fuel cell stack has interspersed along its axis a plurality of reforming chambers each formed by two separator/reformer plates, one having the configuration of said anode facing face of said separator plate facing one of said anode chambers and the second having the configuration of said cathode facing face of said separator plate facing one of said cathode chambers, said two separator/reformer plates sealingly joined in their edge area to enclose a reformer chamber, conduits through said extended manifold wet seal structure providing reaction gas and steam communication from a third set of said manifolds to said reformer chamber, and conduits through said extended manifold wet seal structure providing enriched hydrogen product gas communication to a fuel gas supply manifold, thereby providing fully internal manifolding of reactant gas and steam to and product gas from each said reformer unit in said fuel cell stack.

4. In a fuel cell stack according to claim 3 wherein said separator and separator/reformer plates are pressed metal plates about 0.010 to about 0.050 inch thick.

5. In a fuel cell stack according to claim 4 wherein said flattened peripheral wet seal structure on one face of said plates comprises a pressed shaping of said plates to form said extended peripheral wet seal on said one face of said plates and on the other face of said plates comprises a pressed sheet metal shape forming said extended peripheral wet seal fastened to said other face of said plates.

6. In a fuel cell stack according to claim 5 wherein said extended manifold wet seal structure on one face of said plates comprises a pressed shaping of said plates to form said extended manifold wet seal on said one face of said plates and on the other face of said plates comprises a pressed sheet metal shape forming said extended manifold wet seal fastened to said other face of said plates.

7. In a fuel cell stack according to claim 3 wherein said reformer chambers are interspersed between groups of about five to about ten adjacent fuel cell units.

8. In a fuel cell stack according to claim 1 wherein said separator plates are pressed metal plates about 0.010 to about 0.050 inch thick.

9. In a fuel cell stack according to claim 1 wherein said flattened peripheral wet seal structure on one face of said separator plates comprises a pressed shaping of said separator plates to form said extended peripheral wet seal on said one face of said separator plates and on the other face of said separator plates comprises a pressed sheet metal shape forming said extended peripheral wet seal fastened to said other face of said separator plates.

10. In a fuel cell stack according to claim 1 wherein said extended manifold wet seal structure on one face of said separator plates comprises a pressed shaping of said separator plates to form said extended manifold wet seal on said one face of said separator plates and on the other face of said separator plates comprises a pressed sheet metal shape forming said extended manifold wet seal fastened to said other face of said separator plates.

11. In a fuel cell stack according to claim 1 wherein the width of said wet seals are about ¼ to about ¾ inch.

12. In a fuel cell stack according to claim 1 wherein said separator plates on the side facing said anode are coated or clad with a metal selected from the group consisting of nickel and copper.

13. In a fuel cell stack according to claim 1 wherein said electrolyte comprises a solid ion conductor/solid oxide compound.

14. In a fuel cell stack according to claim 1 wherein said electrolyte comprises alkali metal carbonates.

15. In a fuel cell stack according to claim 14 wherein said electrolyte is assembled into the fuel cell stack in the form of carbonate tapes and matrix tapes.

16. In a fuel cell stack according to claim 14 wherein said flattened peripheral wet seal structure on one face of said separator plates comprises a pressed shaping of said separator plates to form said extended peripheral wet seal on said one face of said separator plates and on the other face of said separator plates comprises a pressed sheet metal shape forming said extended peripheral wet seal fastened to said other face of said separator plates and said extended manifold wet seal structure on one face of said separator plates comprises a pressed shaping of said separator plates to form said extended manifold wet seal on said one face of said separator plates and on the other face of said separator plates comprises a pressed sheet metal shape forming said extended manifold wet seal fastened to said other face of said separator plates.

17. In a fuel cell stack according to claim 1 wherein a current collector is between at least one of said anode and said cathode and said separator plate.

18. In a fuel cell stack comprising a plurality of fuel cell units, each said fuel cell unit comprising an anode and a cathode, an electrolyte in contact on one side with the electrolyte facing face of said anode and in contact on the opposite side with the electrolyte facing face of said cathode, and a separator plate separating said cell units between an anode and cathode forming an anode chamber between the anode facing face of said separator plate and said anode and forming a cathode chamber between the opposite cathode facing face of said separator plate and the separator facing face of the cathode of an adjacent said fuel cell unit, said anode chamber in gas communication with fuel gas supply and outlet and said cathode chamber in gas communication with oxidant gas supply and outlet the improvement comprising: said electrolytes, said anodes, said cathodes, and said separator plates extending to the peripheral edge region of said fuel cell stack, said separator plates having a flattened peripheral wet seal structure extending to contact less than about 1 inch width of at least one of an electrode and a current collector on each face of said separator plates completely around their periphery forming a peripheral wet seal less than about 1 inch width under cell operating conditions, said electrolytes, said anodes, said cathodes, and said separator plates each having a plurality of aligned perforations, said perforations in said separator plates being surrounded by a flattened manifold wet seal structure extending to contact less than about 1 inch width of at least one of said electrode and said current collector on each face of said separator plate forming a manifold wet seal less than about 1 inch width under cell operating conditions to form a plurality of gas manifolds extending through said cell stack, conduits through said extended manifold wet seal structure providing fuel gas communication between one set of said manifolds and said anode chambers on one face of said separator plates and conduits through said extended manifold wet seal structure providing oxidant gas communication between a second set of said manifolds and said cathode chambers on the other face of said separator plates, thereby providing fully internal manifolding of fuel and oxidant gases to and from each said unit fuel cell in said fuel cell stack.

19. In a fuel cell stack according to claim 18 wherein cell stack end plates are configured the same as said separator plates on their inner faces and form half cells on each end of said fuel cell stack.

20. In a fuel cell stack according to claim 19 wherein said fuel cell stack has interspersed along its axis a plurality of reforming chambers each formed by two separator/reformer plates, one having the configuration of said anode facing face of said separator plate facing one of said anode chambers and the second having the configuration of said cathode facing face of said separator plate facing one of said cathode chambers, said two separator/reformer plates sealingly joined in their edge area to enclose a reformer chamber, conduits through said extended manifold wet seal structure providing reaction gas and steam communication from a third set of said manifolds to said reformer chamber, and conduits through said extended manifold wet seal structure providing enriched hydrogen product gas communication to a fuel gas supply manifold, thereby providing fully internal manifolding of reactant gas and steam to and product gas from each said reformer unit in said fuel cell stack.

21. In a fuel cell stack according to claim 20 wherein said flattened peripheral wet seal structure on one face of said plates comprises a pressed shaping of said plates to form said extended peripheral wet seal on said one face of said plates and on the other face of said plates comprises a pressed sheet metal shape forming said extended peripheral wet seal fastened to said other face of said plates.

22. In a fuel cell stack according to claim 21 wherein said extended manifold wet seal structure on one face of said plates comprises a pressed shaping of said plates to form said extended manifold wet seal on said one face of said plates and on the other face of said plates comprises a pressed sheet metal shape forming said extended manifold wet seal fastened to said other face of said plates.

23. In a fuel cell stack according to claim 19 wherein said reformer chambers are interspersed between groups of about five to about ten adjacent fuel cell units.

24. In a fuel cell stack according to claim 18 wherein said separator plates are pressed metal plates about 0.010 to about 0.050 inch thick.

25. In a fuel cell stack according to claim 18 wherein said extended manifold wet seal structure on one face of said separator plates comprises a pressed shaping of said separator plates to form said extended manifold wet seal on said one face of said separator plates and on the other face of said separator plates comprises a pressed sheet metal shape about 0.010 to about 0.050 inch thick forming said extended manifold wet seal fastened to said other face of said separator plates.

26. In a fuel cell stack according to claim 18 wherein the width of said wet seals are about ¼ to about ¾ inch.

27. In a fuel cell stack according to claim 18 wherein said separator plates on the side facing said anode are coated or clad with a metal selected from the group consisting of nickel and copper.

28. In a fuel cell stack according to claim 18 wherein said electrolyte comprises a solid ion conductor/solid oxide compound.

29. In a fuel cell stack according to claim 18 wherein said electrolyte comprises alkali metal carbonates.

30. In a fuel cell stack according to claim 29 wherein said electrolyte is assembled into the fuel cell stack in the form of carbonate tapes and matrix tapes.

31. In a fuel cell stack according to claim 29 wherein said flattened peripheral wet seal structure on one face of said separator plates comprises a pressed shaping of said separator plates to form said extended peripheral wet seal on said one face of said separator plates and on the other face of said separator plates comprises a pressed sheet metal shape forming said extended peripheral wet seal fastened to said other face of said separator plates and said extended manifold wet seal structure on one face of said separator plates comprises a pressed shaping of said separator plates to form said extended manifold wet seal on said one face of said separator plates and on the other face of said separator plates comprises a pressed sheet metal shape forming said extended manifold wet seal fastened to said other face of said separator plates.

32. A subassembly for a fuel cell unit comprising an anode, a separator plate, and a cathode, said fuel cell unit having said anode, said cathode, and said separator plate extending to the edge region of a fuel cell stack, said separator plate having a flattened peripheral wet seal structure less than about 1 inch width extending form each face completely around their periphery, said anode, said cathode, and said separator plate each having a plurality of aligned perforations, said perforations in said separator plates being surrounded by a flattened manifold wet seal structure less than about 1 inch width extending from each face of said separator plate completely around said perforations, conduits through said extended manifold wet seal structure providing fuel gas communication between one set of said manifolds and said anode chamber on one face of said separator plates and conduits through said extended manifold wet seal structure providing oxidant gas communication between a second set of said manifolds and said cathode chamber on the other face of said separator plates, thereby providing fully internal manifolding of fuel and oxidant gases to and from each said unit fuel cell in said fuel cell stack, said anode, said separator plate, and said cathode sealingly joined in each said seal areas.

33. A subassembly according to claim 32 wherein said sealingly joined comprises welding.

34. A subassembly according to claim 32 wherein aid separator plate and said wet seal structure are about 0.010 to about 0.050 inch thick and said about ¼ to about ¾ inch wide in the flattened portions of the wet seal structures.

35. A subassembly according to claim 32 wherein a current collector is between at least one of said anode and said cathode and said separator plate.

36. In a fuel cells tack according to claim 19 wherein said separator and separator/reformer plates are pressed metal plates about 0.010 to about 0.050 inch thick.

37. In a fuel cell stack according to claim 18, wherein said current collector extends to the peripheral edge region of said fuel cell stack.

38. A subassembly according to claim 35 wherein said current collector extends to the edge region of said fuel cell stack.

* * * * *